United States Patent [19]

Glenn

[11] Patent Number: 4,721,998

[45] Date of Patent: Jan. 26, 1988

[54] METHOD AND APPARATUS FOR PROCESSING COLOR VIDEO SIGNALS

[75] Inventor: William E. Glenn, Ft. Lauderdale, Fla.

[73] Assignee: New York Institute of Technology, Old Westbury, N.Y.

[21] Appl. No.: 851,121

[22] Filed: Apr. 11, 1986

[51] Int. Cl.[4] .............................................. H04N 5/14
[52] U.S. Cl. .......................................... 358/37; 358/30
[58] Field of Search ...................... 358/11, 12, 13, 30, 358/36, 37, 38, 39, 40, 166, 167

[56] References Cited

U.S. PATENT DOCUMENTS

| 4,142,211 | 2/1979 | Faroujda | 358/36 |
|---|---|---|---|
| 4,337,479 | 6/1982 | Tomimoto | 358/37 |
| 4,390,894 | 6/1983 | Raven | 358/36 |
| 4,400,721 | 8/1983 | Macovski | 358/37 |
| 4,403,246 | 9/1983 | Thornberry | 358/37 |
| 4,443,817 | 4/1984 | Faroujda | 358/36 |
| 4,517,597 | 5/1985 | Glenn | 358/141 |
| 4,628,344 | 12/1986 | Glenn | 358/12 |

OTHER PUBLICATIONS

"Compatible Transmission of High Definition TV Using Bandwidth Reduction", W. E. Glenn et al., Proc. of NAB, 1983.

"Reduced Bandwidth Requirements for Compatible High Definition TV Transmission", W. E. Glenn et al., Proc. of NAB, 1984.

"Visual Chromaticity-Modulation Transfer Function", Granger et al., J. Opt. Soc. Am., 63, 1973.

"Spatial Mapping of Monkey V1 Cells with Pure Color and Luminance Stimuli", Thorell et al., Vision Research, 24, 1984.

"High-Definition TV System-Signal Standard and Transmission", T. Fujio et al. (NHK), SMPTE, 89, 1980.

Primary Examiner—Michael A. Masinick
Attorney, Agent, or Firm—Martin M. Novack

[57] ABSTRACT

A method and apparatus is disclosed for improving video signals. High spatial frequency portions of color-representative signals are added to a luminance channel in order to improve the apparent sharpness of images having saturated colors, improve monochrome presentations of color images, and/or reduce the bandwidth necessary to represent color-representative signal components of video signals.

29 Claims, 5 Drawing Figures

METHOD AND APPARATUS FOR PROCESSING COLOR VIDEO SIGNALS

BACKGROUND OF THE INVENTION

This invention relates to the processing of video signals, and, more particularly, to a method and apparatus for processing color video signals to improve the apparent sharpness of images having saturated colors, to improve monochrome presentations of color images, and/or to reduce the bandwidth necessary to represent color-representative signal components of video signals.

It is known that an electronic video signal (e.g. a television signal) can be encoded at a reduced bandwidth by lowering the frame refresh rate of the high spatial frequency components, while maintaining the frame refresh rate of at least a portion of the low spatial frequency components at a standard rate. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as has been previously demonstrated, the low spatial resolution information can be generated in a form which is compatible with standard television video; e.g. NTSC video. With regard to these prior teachings, reference can be made to my U.S. Pat. No. 4,517,597, and to my copending U.S. patent application Ser. Nos. 483,126, filed Apr. 8, 1983, now U.S. Pat. No. 4,628,344, and 597,482, filed Apr. 6, 1984, all assigned to the same assignee as the present application. Reference can also be made to the following publications: "Compatible Transmission of High Definition Television Using Bandwidth Reduction", W. E. Glenn, et al., Proceedings of The 37th Annual Broadcast Engineering Conference of National Association of Broadcasters, 1983; "Reduced Bandwidth Requirements For Compatible High Definition Television Transmission", W. E. Glenn, et al., Proceedings of The 38th Annual Broadcast Engineering Conference of National Association of Broadcasters, 1984.

Prior investigators have measured the response of the human visual system to isoluminance pairs. See, for example, Granger, et al., "Visual Chromaticity-Modulation Transfer Function", Journal of the Optical Society of America, Vol. 63, No. 9, September, 1973. I have also made measurements, using isoluminance chromaticity gratings, to determine human visual response. It has been observed that as the spatial frecuency of color gratings is increased beyond a certain point, the viewer can still discern the grating, but sees it as a grey grating, rather than a color grating. This phenomenon is also discussed in an article entitled "Spatial Mapping of Monkey V1 Cells With Pure Color and Luminance Stimuli", Thorell, et al., Vision Research, Vol. 24, No. 7, 1984.

It is among the objects of the present invention to utilize this phenomenon to advantage in processing color video signals, in order to achieve one or more of the following results: improvement of images obtainable from standard or high resolution color video signals by increasing the sharpness of images or portions of images having saturated colors; improvement of monochrome images derived from color signals; and reduction of the bandwidth of signals necessary for representing high resolution or standard color video signals.

SUMMARY OF THE INVENTION

The present invention is directed to a method and apparatus for generating video signals representative of an image. The invention is applicable to the processing of color video signals derived from any suitable source, for example a color television camera or cameras (standard and/or high resolution), or recorded video signals. The processed signals hereof can be displayed, recorded, decoded and displayed, transmitted, or any suitable combination thereof, with improvement of apparent sharpness of saturated colors, improvement of monochrome presentations of color images, and/or saving of bandwidth necessary to display, record, and/or transmit the resultant video signals.

To assist in understanding operation of the invention, consider an image consisting of a background of one saturated color with thin stripes of a different saturated color traversing the background. Assume further that the two colors have the same luminance value. Due to the phenomenon described in the Background portion hereof, as the stripes are made thinner and thinner, they will eventually be viewed by an observer as stripes of no discernable color; i.e., they will appear as having a difference in luminance from the background (assuming they have not been made so thin as to be below the spatial resolution of the eye for luminance). In a "full resolution" high definition color television system the stripes would appear as they should appear. In particular, the stripes would not appear in the luminance channel (since they have the same luminance value as their surrounding background), but they would appear as a difference in chrominance, so a viewer would see them in the natural way—that is, as stripes having a different luminance than the background (again, due to the above-mentioned phenomenon). However, in a system that has less than full color resolution, the stripes may not be seen, since in the chrominance channel the resolution would be insufficient for presentation of the thin stripes of color. In the present invention, high spatial frequency color-representative signals are inserted into the luminance channel and combined with luminance signals. In certain systems, such as those using standard resolution NTSC television signals, this results in an enhancement of the apparent sharpness of saturated colors. It also results in better definition of interfaces between colors having the same luminance value. Further, in embodiments where said high spatial frequency color-representative signals are removed from the chrominance channel, substantial bandwidth can be saved, which reduces the bandwidth necessary for transmitting, recording, and/or displaying the television signals. This is of particular advantage in high definition television systems.

In accordance with one embodiment of the invention, there is set forth a method for generating video signals, including the step of deriving an input luminance signal and a plurality of input color-representative signals which are representative of an image. The luminance and color-representative signals can be derived from any suitable source, for example from a color television camera or cameras, or from a video recording system, or from previously processed video signals. Also, as used herein, the term color-representative signals is intended to include color component signals such as R, G, B signals or color difference signals such as R-Y, B-Y or I, Q signals, or other forms of signals which include, in any form, color components such as R, G, and B. An enhancement signal, representative of the high spatial frequency portion of at least one of the color-representative signals is produced from said at least one input color-representative signal. The enhancement signal is combined with the input luminance signal to obtain an enhanced luminance signal. In a form of this embodiment, the high spatial frequency portion of said at least one input color-representative signal is separated from said at least one color-representative signal, and the remaining signal, which is representative of the low spatial frequency portion of said at least one input color-representative signal, is combined with the other one or more input color-representative signals to obtain a chrominance signal.

In another embodiment of the invention there is set forth a method for generating a video luminance signal, including the step of deriving a plurality of color-representative signals which are typically, although not necessarily, R, G, and B color component signals. At least one of the color component signals is processed to emphasize the high spatial frequency portion thereof with respect to the low frequency portion thereof. The processed at least one color component signal is then combined with the other color component signals to obtain an output luminance signal. In the preferred form of this embodiment, the at least one color component signal is the red color component signal (R). In measurements referred to in the Background portion hereof, it was noted that the red portion of an isoluminance grating will always appear as the brighter stripes (as compared to any companion color of the same luminance) of the grey grating the viewer perceives, as the isoluminance grating is made to be of higher spatial frequency. Similarly, the blue stripes of an isoluminance grating will always appear as the darker stripes as the grating is made finer. In the present invention, emphasizing the high spatial frequencies of the red color component signal before deriving a luminance signal results in enhancing the luminance signal such that the high spatial frequencies will be more readily visible to an observer of the ultimately displayed picture. In other words, this tends to make brighter the bright portions of the perceived isoluminance gratings at high spatial frequency in the example set forth. Regarding the blue color component signal (B), deemphasizing (or attenuating) the high spatial frequency portion is what is implemented. In the example set forth, this tends to make darker the dark portions of the perceived isoluminance gratings at high spatial frequency.

The present invention also has application to high definition television systems, for example systems of the type set forth in the above-identified copending U.S. patent applications and articles. In an embodiment of one such system, the following method steps are implemented: deriving at least one high resolution luminance signal and at least one low resolution luminance signal representative of a scene; deriving a plurality of high resolution color representative signals and a plurality of low resolution color-representative signals representative of said scene; processing at least one of said high resolution color-representative signals to separate therefrom an enhancement signal representative of the high spatial frequency portion of said at least one high resolution color-representative signal; combining said enhancement signal with said at least one low resolution luminance signal to obtain an enhanced low resolution luminance signal; and combining the remaining portion of said at least one high resolution color-representative signal with the other one or more of the high resolution color-representative signals to obtain a high resolution chrominance signal.

Further features and advantages of the invention will become more readily apparent from the following detailed description when taken in conjunction with the accompanying drawings.

DESCRIPTION OF THE PREFERRED EMBODIMENTS

Figure 1:
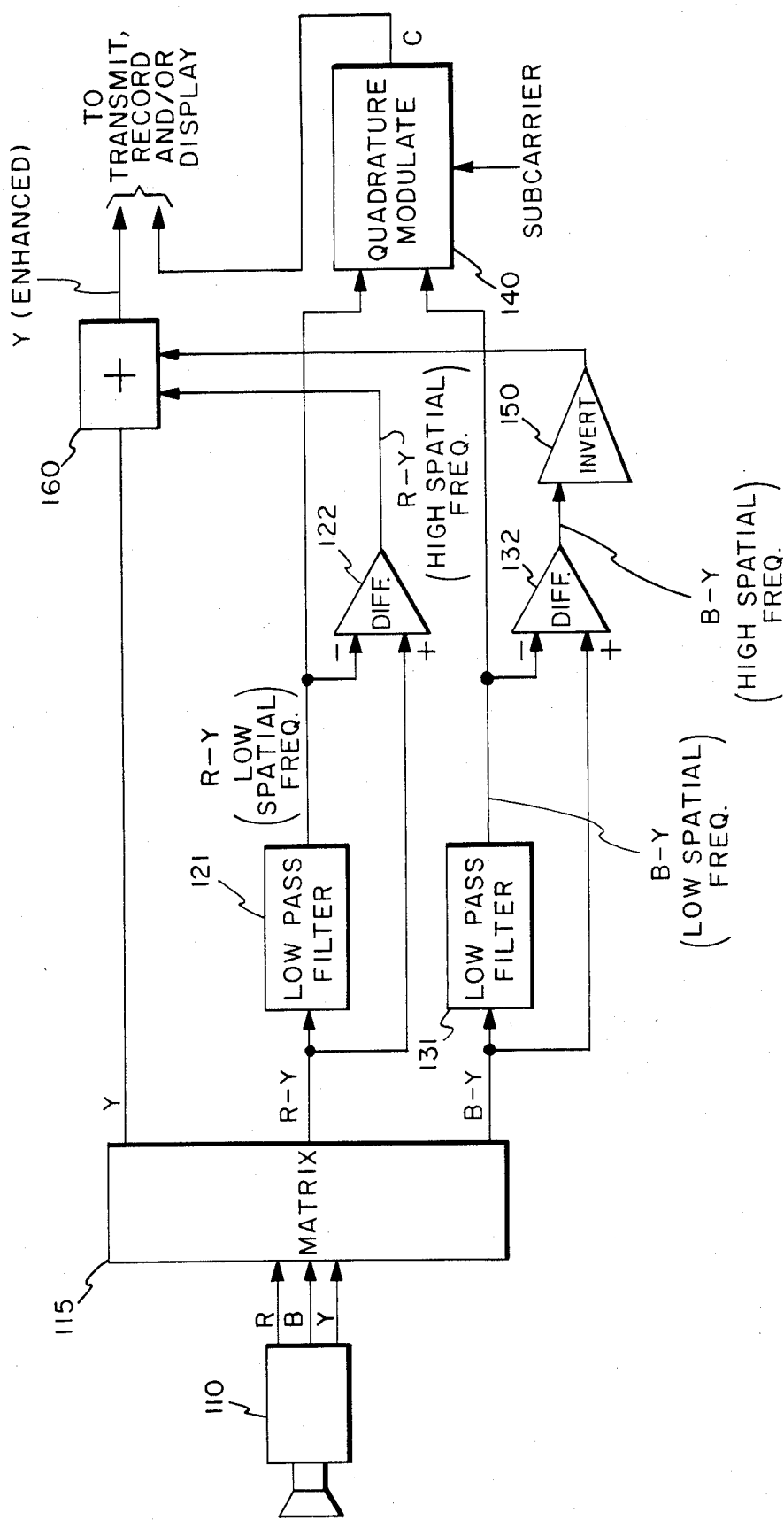
FIG. 1 is a block diagram of an apparatus in accordance with an embodiment of the invention, and which can be used to practice an embodiment of a method of the invention, for processing color television signals.

Referring to FIG. 1, there is shown an apparatus in accordance with an embodiment of the invention and which can be used to practice a form of the method of the invention. A luminance signal Y and color difference signals, R-Y and B-Y, respectively, are derived from any suitable source. In the example of FIG. 1, a television camera 110, which may be a conventional color television camera, generates color component signals R, G and B, and these signals are coupled to a matrix 115 which can operate, in conventional manner, to produce the signals Y, R-Y, and B-Y. As is known, the color difference signals can be filtered (by means not shown) so that the derived signals have the bandwidths indicated in the diagram; i.e., Y: 4.2 MHz, R-Y: 2 MHz, B-Y: 1.4 MHz.

In accordance with a feature of the invention, the signals R-Y is coupled to low-pass filter 121 and the signal B-Y is coupled to low-pass filter 131. In the present embodiment, the filter 121 is a 1 MHz low-pass filter and the filter 131 is a 0.5 MHz low-pass filter, although other frequencies can be utilized. The outputs of low-pass filters 121 and 131 are respectively designated as R-Y (low spatial frequencies) and B-Y (low spatial frequencies); that is, the color difference signals with the high frequency portions thereof removed. These signals are coupled to quadrature modulator 140 which operates to produce a chrominance signal output.

The outputs of the filters 121 and 131 are also coupled to respective inputs of subtraction circuits 122 and 132. The other respective inputs to the subtraction circuits (positive terminals) are the original derived signals R-Y and B-Y. The output of subtraction circuits 122 and 132 represent the high spatial frequency components of the color difference signals. The B-Y high spatial frequency component is inverted by inverter 150 and then added by summer 160 to the R-Y high spatial frequency component and to the luminance signal, Y. The modified luminance signal, output from summer 160, along with a chrominance signal, C, obtained by quadrature modulating the color difference signals with a subcarrier (block 140) can then be transmitted, recorded, and/or displayed.

In operation, it is seen that the high frequency portion of the color-representative signals (color difference signals, in this embodiment), which would be perceived as luminance in any event if viewable, as previously described, is added to the luminance channel. As discussed above, the red component is emphasized (by adding in the high frequency component), and the blue component is attenuated (by inverting the high frequency component before adding it in). This results in enhanced sharpness in the viewing of saturated colors on a color display. Also, for monochrome presentations (i.e., viewing the luminance signal only) it enhances the definition of interfaces between colored regions in the original image having the same luminance value. The high frequency portions of the color-representative signals are in a frequency range that lies within the overall luminance bandwidth, so no substantial increase in luminance bandwidth is necessary to accommodate these signals. The difference circuits 122 and 132 are utilized in this embodiment to remove the high frequency portions from the color difference signals before they are transmitted. The resultant modified chrominance signal (with the high frequency portion removed) requires less bandwidth.

It will be understood that variations can be implemented in the embodiments hereof. For example, while emphasis or attenuation (as the case may be) of the high frequency components is illustrated in this embodiment as being implemented for the horizontal direction, it will be understood that filtering can also be implemented in the vertical direction (using, for example, the type of vertical filtering described in the above-referenced copending U.S. applications), with the filtered signals then being appropriately added or subtracted from luminance. For conventional NTSC color television transmissions, color is already transmitted at full resolution in the vertical direction. In other applications, both horizontal and vertical enhancement of luminance with the high frequency portions of color-representative signals may be more advantageous. Also, it will be understood that in this and other embodiments it may be sufficient to perform the described processing on only a single one of the color-representative signals, for example only on R-Y. From the standpoint of saving bandwidth, for example, more bandwidth is typically utilized by the R-Y color-representative signal than by B-Y. Accordingly, the largest saving in bandwidth accrues from the processing of R-Y in this embodiment. This is of particular importance in high definition television systems (as will be further described hereinbelow), or in any transmission, recording, or display system wherein it is desired to save bandwidth in the chrominance channel. Also, it will be understood that processing can be implemented on I and Q, if desired, instead of R-Y and B-Y, with appropriate adjustment for the differences in phase angles.

Figure 3:
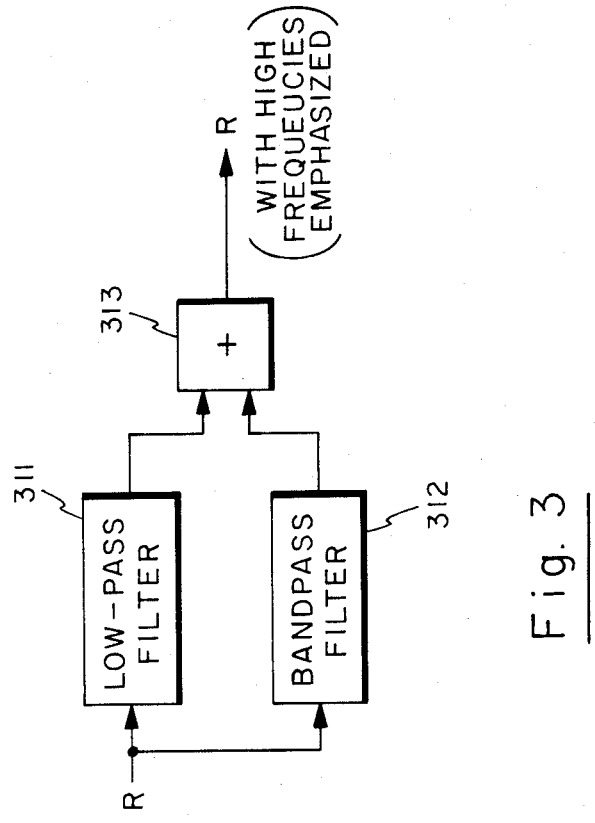
FIG. 3 is a block diagram of an embodiment of one of the circuits used in FIG. 2.
Figure 2:
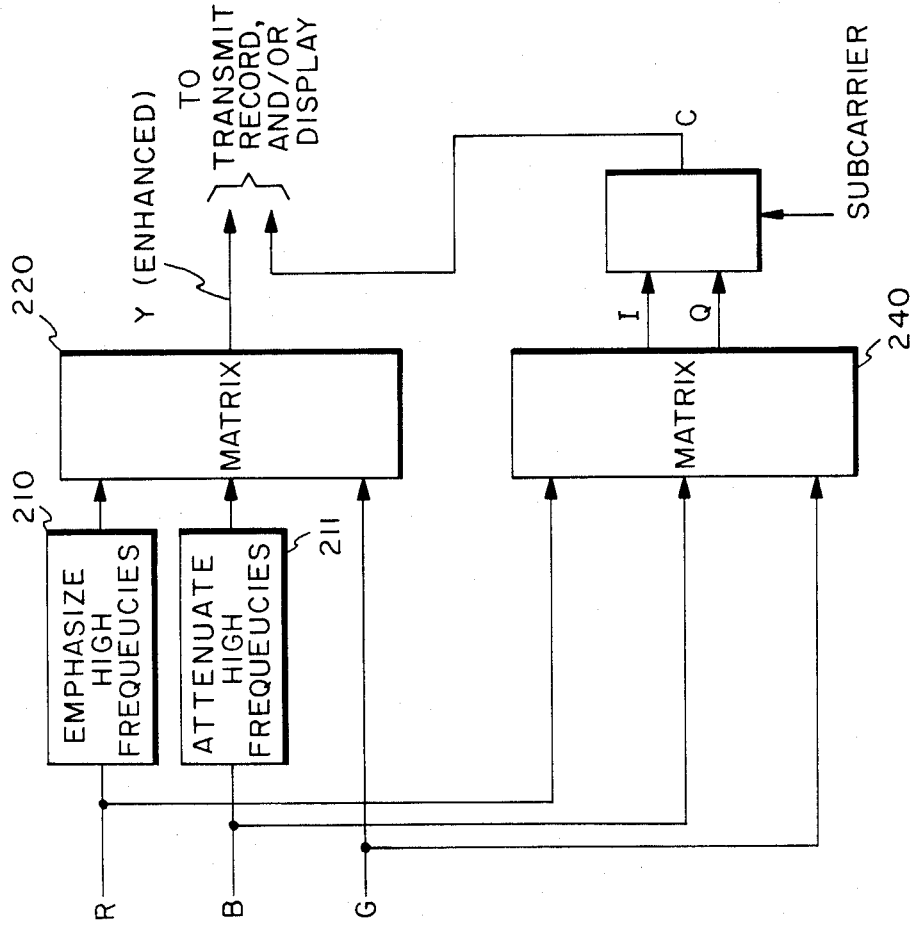
FIG. 2 is a block diagram of an apparatus in accordance with another embodiment of the invention, and which can be used to practice another embodiment of the method of the invention, for processing color television signals.

Referring to FIG. 2, there is shown an embodiment of the invention wherein the emphasis and/or attenuation of color-representative signals is performed when a luminance signal is first generated. Color-representative signals, which in this case are color component signals R, G and B are again derived from any suitable source. These color component signals are applied to a matrix 220, with the red component signal being applied via a circuit 210 which emphasizes the high frequency portion thereof, and the blue component signal being applied via a circuit 211 which attenuates the high frequency portion thereof. The circuit 211 may comprise a low-pass filter. The circuit 210 may comprise, for example, the type of configuration shown in FIG. 3 which includes a low-pass filter 311 and a bandpass filter 312 in parallel, with the outputs of these parallel filters being coupled to a summer 313. With the bandpass filter characteristic 312 being selected to overlap with the high frequency end of low pass filter 311, the result will be a red component signal with the high frequency portion of its spectrum being emphasized. It will be understood that various suitable circuits are known in the filtering art, and can be employed for this purpose. Also, suitable amplification of any or all of the color component signals can be employed before or after the selective emphasis and/or attenuation is implemented. The matrix 220 may be a conventional type of luminance matrix which, in this case, will produce a luminance signal designated Y (enhanced). The derived color component signals are also coupled to another matrix 230 which can operate in conventional fashion to produce Y and Q signals (or, color difference signals at any suitable angles). A quadrature modulation circuit 240, in conjunction with a subcarrier, can then be employed, in conventional fashion, to produce the chrominance signal, Q. The signals Y (enhanced) and Q can then be transmitted, recorded, and/or displayed. If desirable, in this embodiment, as before, the color component signals can be filtered to remove high frequency portions thereof before forming Y and Q.

In my above-referenced copending U.S. patent application Ser. No. 597,482, there is disclosed an embodiment of an improvement for encoding and processing the portion of standard resolution video spectrum above 2.5 MHz where color and luminance information are not adequately separated by conventional color television processing. Briefly, a conventional type of NTSC transmission is modified by adding together the R-Y, B-Y and Y signals above 2.5 MHz, the information being repeated for two successive frames with the color carrier reversed in phase as it normally does. At the receiver, a frame store can be used to add these same two frames or subtract them. The sum gives the Y signal above 2.5 MHz without any color signal (the color signal was made identical for those two frames but the carrier is reversed in phase). The difference of the two frames gives color without cross-color. Since the luminance is identical for the two frames the difference is zero in this frequency range. With this arrangement the frame rate for the color and for the luminance above 2.5 MHz is half the conventional frame rate; i.e., fifteen frames per second. However, based on psychophysical studies, this will be adequate. The system as disclosed in an embodiment of the referenced copending application is compatible with standard receivers and with "enhanced" (that is, beyond standard but not full high resolution) receivers which include a frame store and circuitry to decode the consecutive identical frames of color and detail luminance information. In both cases the slower frame rate for the color information and for detail luminance information will cause no appreciable degradation in perceived picture quality due to characteristics of human vision. In the enhanced receiver, however, the improved separation of color and detail luminance will be a distinct advantage. This advantage is also present in a full capability high resolution receiver which further includes the high resolution luminance and color component signals. Reference can be made to the above-referenced copending U.S. patent application Ser. No. 597,482 for further details. Portions of this system will be described next, as used in conjunction with improvements of the present invention.

Figure 4:
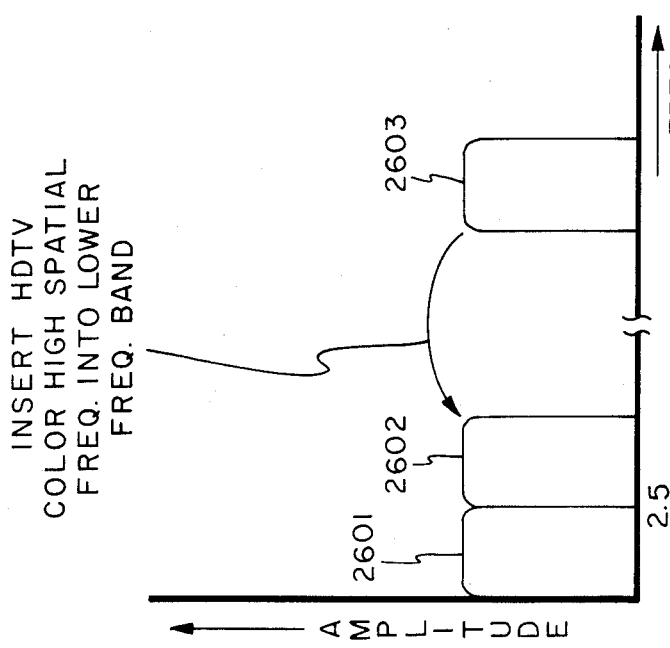
FIG. 4 is a diagram of a frequency spectrum as used in a high definition television system, and shows how the spectrum is modified by using an improvement in accordance with the present invention.

The previously described modification to a standard NTSC transmission would allow transmission of Y up to 4.2 MHz and I and Q up to their normal bandwidths without cross-color or cross-luminance. High resolution luminance and chrominance detailed information could be transmitted at an even lower frame rate, one example given being the use of 7.5 frames per second and diagonal sampling, to take advantage of the oblique effect. In this example, the 4.2 MHz of modified standard NTSC transmission carries the more rapidly changing low resolution information. Another low bandwidth channel is used to carry the remaining high resolution detail and color information at the slower frame rate. FIG. 4 shows a typical video spectrum of the previously proposed system. The conventional low frecuency channel is used to transmit up to 2.5 MHz unchanged at 30 frames per second interlaced (band 2601). From 2.5 MHz to 4.2 MHz the detail luminance and the chrominance are repeated to give 15 frames per second presentation (band 2602). Another frequency band (band 2603 in FIG. 4) can be used to transmit the higher detail luminance and the detail chrominance at, for example, 7.5 frames per second.

The arrow in FIG. 4 shows how the improvement of the present invention can be utilized to modify the type of system set forth in the above-referenced copending U.S. Patent Application. In particular, the high spatial frequency portion of at least one of the color-representative signals that would have been transmitted in the band 2603 is instead extracted and added to the detail luminance information in the band 2602 (using, e.g., the type of technique described in conjunction with FIG. 1). Since this high resolution color information is within about the same bandwidth as the detail luminance, no substantial increase in the band 2602 is necessary, but a substantial saving in bandwidth is achieved with regard to the information that needs to be transmitted in band 2603.

Figure 5:
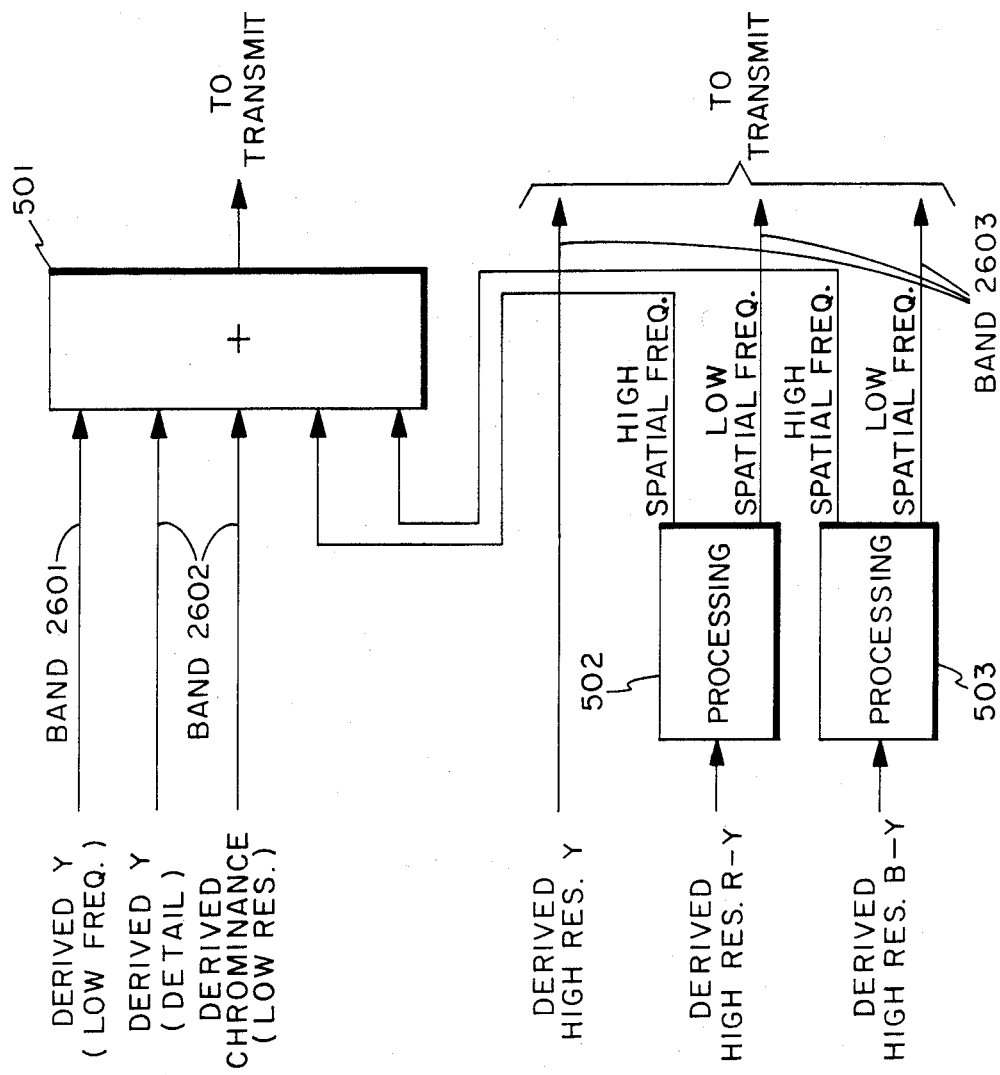
FIG. 5 is a block diagram of another apparatus in accordance with an embodiment of the invention, and which can be used to practice another form of the method of the invention.

FIG. 5 is a simplified block diagram which illustrates the manner in which the principles of the present invention can be employed in conjunction with the type of system described in the above-referenced copending U.S. patent application Ser. No. 597,482. A summer 501 is illustrated as receiving the derived low frequency luminance (the information in band 2601 of FIG. 4), and the derived detail luminance and the derived standard resolution chrominance (which together comprise the information in band 2602). The derived high resolution luminance and high resolution R-Y and B-Y signals would normally contain the information to be transmitted in the band 2603. However, as shown in FIG. 5, processing circuitry 502 and 503 (each of which circuits may comprise a combination of a low-pass filter and a difference circuit, as shown in FIG. 1, with an inverter for the B-Y circuit) can be used, as in FIG. 1, but with frequencies selected appropriately for the high definition case, to separate out the high spatial frequencies for addition to the lower frequency bands.

In my copending U.S. patent application Ser. No. 661,651, filed Oct. 17, 1984, and assigned to the same assignee as the present application, there is disclosed an improved high definition compatible color television system which employs, in one embodiment thereof, a standard resolution color television camera, and a high definition monochrome color television camera. It will be understood that the luminance and color-representative signals, which are further processed in accordance with the principles of the present invention, can be derived from the type of television camera system disclosed in that copending referenced U.S. patent application.

The invention has been described with reference to particular preferred embodiments, but variations within the spirit and scope of the invention will occur to those skilled in the art. For example, it will be understood that appropriate equalizing delays can be employed in the circuits, where necessary, to equalize for propagation time through the processing circuits.

I claim:

1. A method for generating a video luminance signal, comprising the steps of:
   deriving a plurality of color-representative signals, representative of an image;
   processing at least one of said plurality of color-representative signals to emphasize the high spatial frequency portion thereof with respect to the low spatial frequency portion thereof; and
   combining the processed at least one color-representative signal with the other color-representative signals to obtain an output luminance signal.

2. The method as defined by claim 1, further comprising the step of processing of another of said plurality of color-representative signals to attenuate the high spatial frequency portion thereof with respect to the low spatial frequency portion thereof before said another color-representative signal is subjected to said combining step.

3. The method as defined by claim 2, wherein said another color-representative signal is a blue color component signal.

4. The method as defined by claim 3, wherein said plurality of color-representative signals comprise red, blue, and green color component signals.

5. The method as defined by claim 2, wherein said at least one color-representative signal is a red color component signal.

6. The method as defined by claim 5, wherein said another color-representative signal is a blue color component signal.

7. The method as defined by claim 6, wherein said plurality of color-representative signals comprise red, blue, and green color component signals.

8. The method as defined by claim 1, wherein said at least one color-representative signal is a red color component signal.

9. A method for generating video signals, comprising the steps of:
   deriving a plurality of input color-representative signals, representative of an image;

processing at least one of said plurality of input color-representative signals to emphasize the high spatial frequency portion thereof with respect to the low spatial frequency portion thereof;

combining the processed at least one color-representative signal with the other color representative signals to obtain an output luminance signal; and combining said plurality of input color-representative signals to obtain an output chrominance signal.

10. The method as defined by claim 9, wherein said at least one input color-representative signal is a red color component signal.

11. The method as defined by claim 9, further comprising the step of processing of another of said plurality of input color-representative signals to attenuate the high spatial frequency portion thereof with respect to the low spatial frequency portion thereof before said another input color-representative signal is subjected to said combining step.

12. The method as defined by claim 11, wherein said another input color-representative signal is a blue color component signal.

13. The method as defined by claim 12, wherein said plurality of input color-representative signals comprise red, blue, and green color component signals.

14. The method as defined by claim 11, wherein said at least one input color-representative signal is a red color component signal.

15. The method as defined by claim 14, wherein said another input color-representative signal is a blue color component signal.

16. The method as defined by claim 15, wherein said plurality of input color-representative signals comprise red, blue, and green color component signals.

17. A method for generating an enhanced video luminance signal, comprising the steps of:

deriving an input luminance signal and a plurality of input color-representative signals, representative of an image;

producing, from at least one of said input color-representative signals, an enhancement signal representative of the high spatial frequency portion of said at least one input color-representative signal; and combining said enhancement signal with said luminance signal to obtain an enhanced luminance signal.

18. The method as defined by claim 17, wherein said input color-representative signals are a function of both a color component signal and a luminance signal.

19. The method as defined by claim 18, wherein said at least one color-representative signal is in the form of a color difference signal.

20. The method as defined by claim 17, wherein said at least one input color representative signal is a function of a red color component signal and a luminance signal.

21. The method as defined by claim 17, further comprising the step of producing, from another of said input color-representative signals, another enhancement signal representative of the high spatial frequency portion of said another color-representative signal.

22. The method as defined by claim 21, wherein said another input color representative signal is a function of a blue color component signal and a luminance signal.

23. A method for generating video signals, comprising the steps of:

deriving an input luminance signal and a plurality of input color-representative signals, representative of an image;

producing, from at least one of said input color-representative signals, an enhancement signal representative of the high spatial frequency portion of said at least one color-representative signal;

combining said enhancement signal with said input luminance signal to obtain an enhanced luminance signal; and combining said input color-representative signals to obtain a chrominance signal.

24. A method for generating video signals, comprising the steps of:

deriving an input luminance signal and a plurality of input color-representative signals, representative of an image;

separating said at least one of said input color-representative signals into an enhancement signal representative of the high spatial frequency portion of said at least one input color-representative signal, and a remaining signal representative of the low spatial frequency portion of said at least one input color-representative signal;

combining said enhancement signal with said input luminance signal to obtain an enhanced luminance signal; and combining said remaining signal with the other one or more input color-representative signals to obtain a chrominance signal.

25. A method for generating video signals, comprising the steps of:

deriving at least one high resolution luminance signal and at least one low resolution luminance signal representative of a scene;

deriving a plurality of high resolution color representative signals and a plurality of low resolution color-representative signals representative of said scene;

processing at least one of said high resolution color-representative signals to separate therefrom an enhancement signal representative of the high spatial frequency portion of said at least one high resolution color-representative signal;

combining said enhancement signal with said at least one low resolution luminance signal to obtain an enhanced low resolution luminance signal; and combining the remaining portion of said at least one high resolution color-representative signal with the other one or more of the high resolution color-representative signals to obtain a high resolution chrominance signal.

26. Apparatus for generating video signals, comprising:

means for deriving a plurality of input color-representative signals, representative of an image;

means for processing at least one of said plurality of input color-representative signals to emphasize the high spatial frequency portion thereof with respect to the low spatial frequency portion thereof;

means for combining the processed at least one color-representative signal with the other color representative signals to obtain an output luminance signal; and means for combining said plurality of input color-representative signals to obtain an output chrominance signal.

27. Apparatus as defined by claim 26, further comprising means for processing another of said plurality of input color-representative signals to attenuate the high spatial frequency portion thereof with respect to the low spatial frequency portion thereof before said another input color-representative signal is combined with the other input color-representative signals.

28. Apparatus for generating video signals, comprising:
   means for deriving an input luminance signal and a plurality of input color-representative signals, representative of an image;
   means for producing, from at least one of said input color-representative signals, an enhancement signal representative of the high spatial frequency portion of said at least one color-representative signal;
   means for combining said enhancement signal with said input luminance signal to obtain an enhanced luminance signal; and
   means for combining said input color-representative signals to obtain a chrominance signal.

29. Apparatus for generating video signals, comprising:
   means for deriving an input luminance signal and a plurality of input color-representative signals, representative of an image;
   means for separating said at least one of said input color-representative signals into an enhancement signal representative of the high spatial frequency portion of said at least one input color-representative signal, and a remaining signal representative of the low spatial frequency portion of said at least one input color-representative signal;
   means for combining said enhancement signal with said input luminance signal to obtain an enhanced luminance signal; and
   means for combining said remaining signal with the other one or more input color-representative signals to obtain a chrominance signal.

* * * * *